US008478602B2

(12) United States Patent
Racca et al.

(10) Patent No.: US 8,478,602 B2
(45) Date of Patent: Jul. 2, 2013

(54) EXECUTING BUSINESS PROCESSES USING PERSISTENT VARIABLES

(75) Inventors: Felix G. Racca, Irving, TX (US); Emilio L. Gabeiras, Buenos Aires (AR)

(73) Assignee: Oracle International Corporation, Redwood Shores, CA (US)

( * ) Notice: Subject to any disclaimer, the term of this patent is extended or adjusted under 35 U.S.C. 154(b) by 1661 days.

(21) Appl. No.: 10/114,491

(22) Filed: Apr. 1, 2002

(65) Prior Publication Data

US 2008/0306746 A1    Dec. 11, 2008

Related U.S. Application Data

(60) Provisional application No. 60/280,622, filed on Mar. 30, 2001.

(51) Int. Cl.
*G06Q 10/00* (2012.01)
(52) U.S. Cl.
USPC .......................................................... 705/1.1
(58) Field of Classification Search
USPC ..... 705/1, 1.1; 700/1; 709/201, 202; 717/100
See application file for complete search history.

(56) References Cited

U.S. PATENT DOCUMENTS

| 5,214,756 | A | * | 5/1993 | Franklin et al. ............... 715/839 |
|---|---|---|---|---|
| 5,481,699 | A | * | 1/1996 | Saether ............................ 714/15 |
| 5,832,203 | A | * | 11/1998 | Putzolu et al. ................... 714/20 |
| 5,862,379 | A | * | 1/1999 | Rubin et al. .................... 717/109 |
| 5,892,948 | A | * | 4/1999 | Aoki et al. ...................... 717/105 |
| 5,895,492 | A | * | 4/1999 | Greenspan et al. ............ 711/147 |
| 5,944,781 | A | * | 8/1999 | Murray .......................... 709/202 |
| 6,054,986 | A | * | 4/2000 | Kato ............................... 715/763 |
| 6,185,577 | B1 | * | 2/2001 | Nainani et al. ............ 395/182.18 |
| 6,225,998 | B1 | * | 5/2001 | Okita et al. .................... 715/853 |
| 6,278,977 | B1 | | 8/2001 | Agrawal et al. |
| 6,286,028 | B1 | * | 9/2001 | Cohen et al. ................... 709/202 |
| 6,295,610 | B1 | * | 9/2001 | Ganesh et al. ................... 714/19 |
| 6,338,074 | B1 | | 1/2002 | Poindexter et al. |
| 6,366,300 | B1 | * | 4/2002 | Ohara et al. ................... 715/771 |
| 6,507,875 | B1 | | 1/2003 | Mellen-Garnett et al. |
| 6,725,445 | B1 | | 4/2004 | Leymann et al. |
| 6,751,657 | B1 | | 6/2004 | Zothner |
| 6,766,324 | B2 | | 7/2004 | Carlson et al. |
| 7,024,669 | B1 | | 4/2006 | Leymann et al. |
| 7,027,997 | B1 | | 4/2006 | Robinson et al. |
| 7,062,749 | B2 | | 6/2006 | Cyr et al. |

(Continued)

FOREIGN PATENT DOCUMENTS

WO          9827479          6/1998

OTHER PUBLICATIONS

Brian T. Kurotsuchi, "The Wonders of Java Serialization" labeled as Serial_Wonder Unzipped Files, Aug. 31, 2000.*

(Continued)

*Primary Examiner* — Naresh Vig
(74) *Attorney, Agent, or Firm* — Fliesler Meyer LLP

(57) ABSTRACT

Executing a business process includes initiating an instance of a business process comprising activities, where the instance has an instance variable. A first activity of the business process is executed, and a value corresponding to the instance variable is received. The instance variable and the value is recorded in an object, and the object is stored in a data repository. A second activity of the business process is executed, and the object is retrieved from the data repository for use with the second activity.

20 Claims, 11 Drawing Sheets

U.S. PATENT DOCUMENTS

| | | |
|---|---|---|
| 7,603,674 B2 | 10/2009 | Cyr et al. |
| 2001/0044738 A1 | 11/2001 | Elkin et al. |
| 2003/0078957 A1 | 4/2003 | Cheeniyil et al. |
| 2004/0098154 A1 | 5/2004 | McCarthy |
| 2006/0150156 A1 | 7/2006 | Cyr et al. |

OTHER PUBLICATIONS

David Reilly, Object Serialization Made Easy, 1998-2000; Last Modified Jan. 17, 2001, printed through www.archive.org.*

Deitel & Deitel, Java How to Program, 1998, Prentice Hall.*

Heinz M. Kabutz, Depth-First Polymorphism, Feb. 15, 2001, Maximum Solutions.*

Fred G. Martin, Persistent Global Variables, Mar. 29, 1996.*

U.S. Appl. No. 10/114,585, filed Apr. 1, 2002, entitled "*Designing Business Processes Using Parametric Roles*," 61 total pages.

U.S. Appl. No. 10/114,146, filed Apr. 1, 2002, entitled "*Designing Business Processes Using Distributed Process Flows*," 59 total pages.

U.S. Appl. No. 10/114,493, filed Apr. 1, 2002, entitled "*Publishing And Deploying Business Processes*," 60 total pages.

Shan, M-C, et al., "Business Process Flow Management and its Application in the Telecommunications Management Network," Article 8, Hewlett-Packard Journal, 9 pages (Oct. 1996).

Leymann, F., et al., "Managing Business Processes as an Information Resource," IBM Systems Journal, vol. 33, No. 2, pp. 326-348 (Nov. 1994).

* cited by examiner

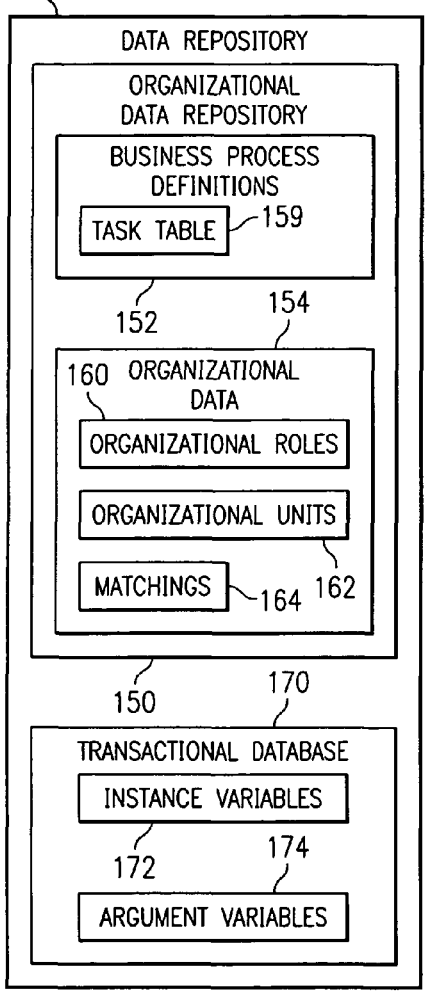
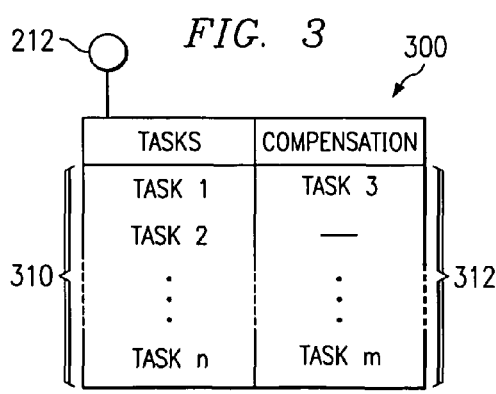
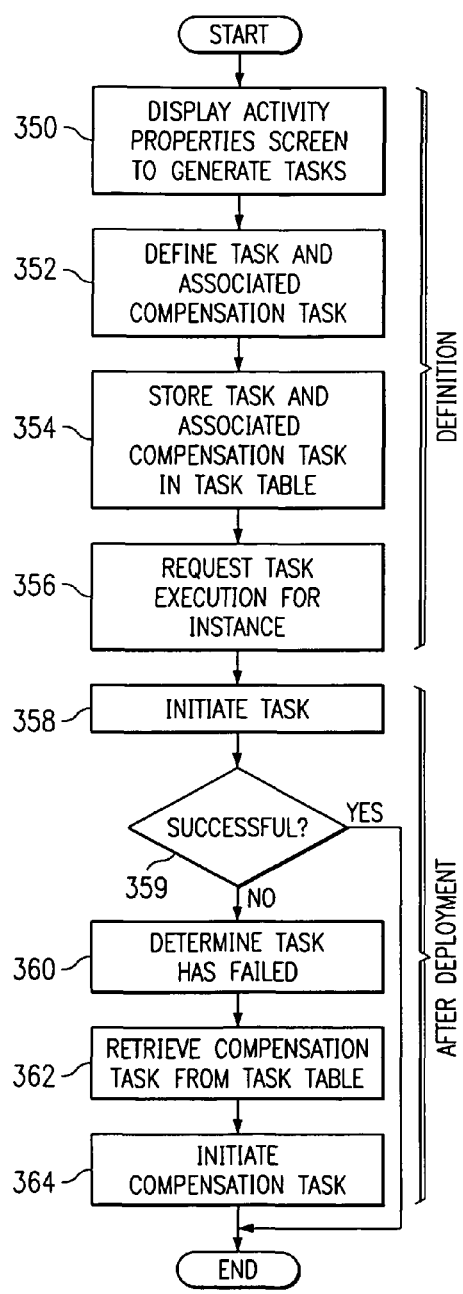

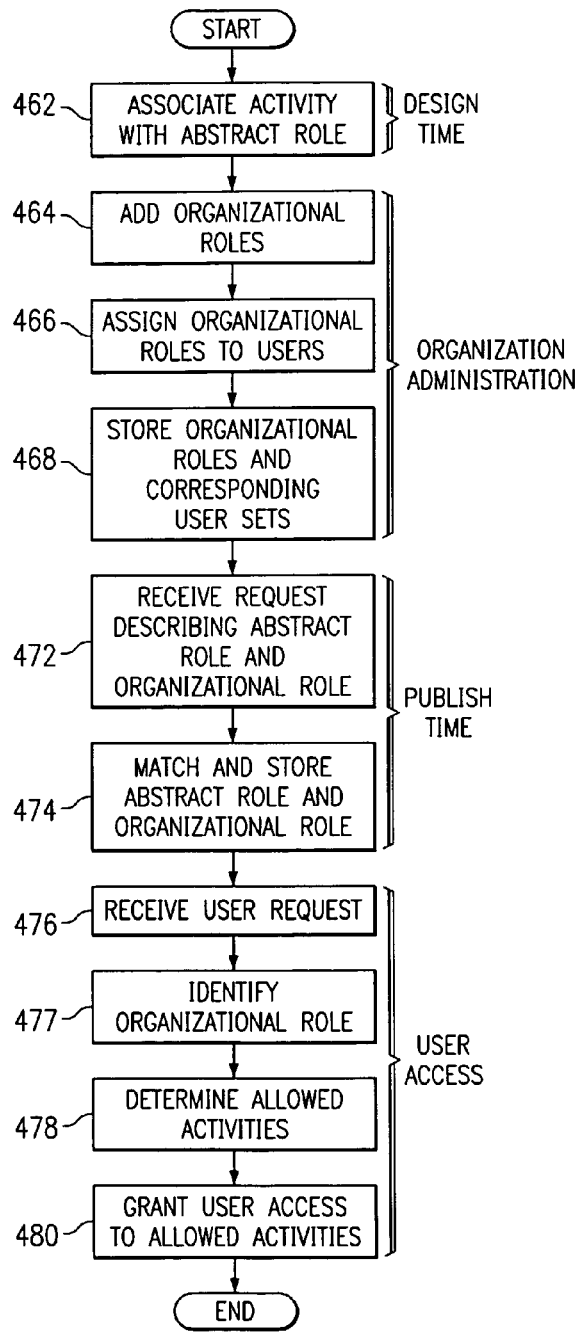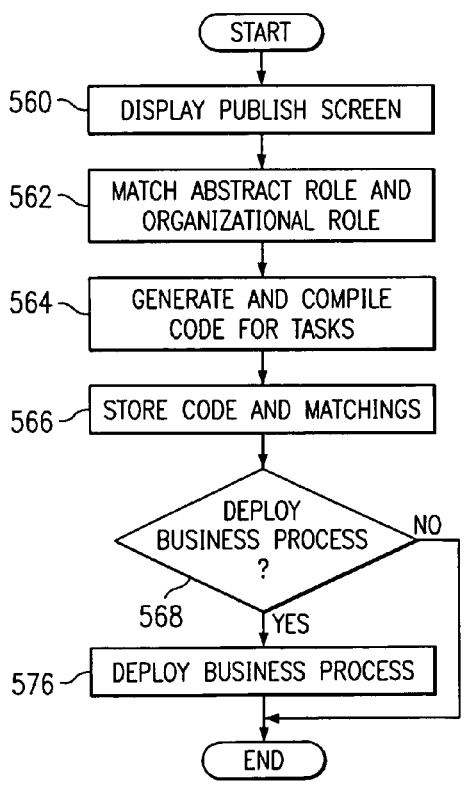

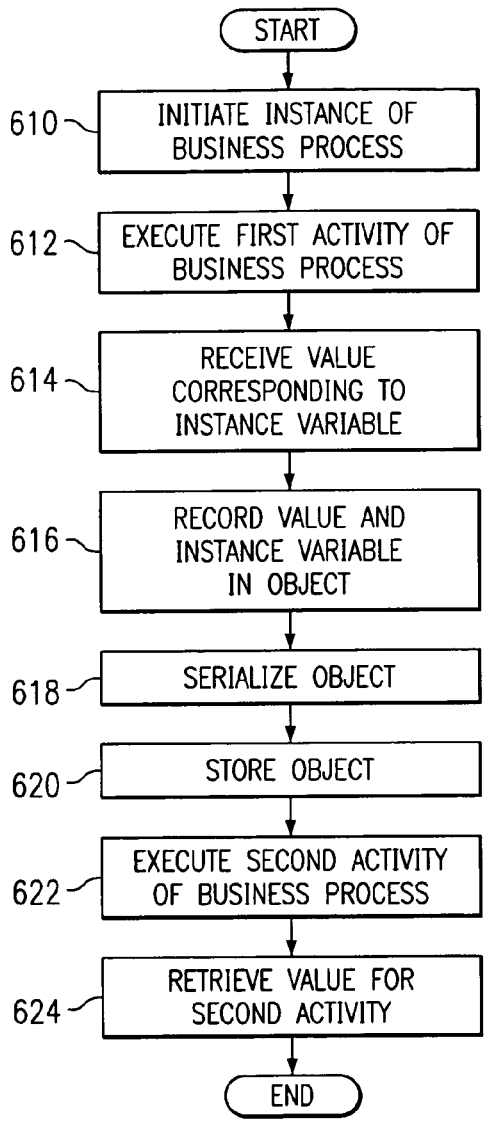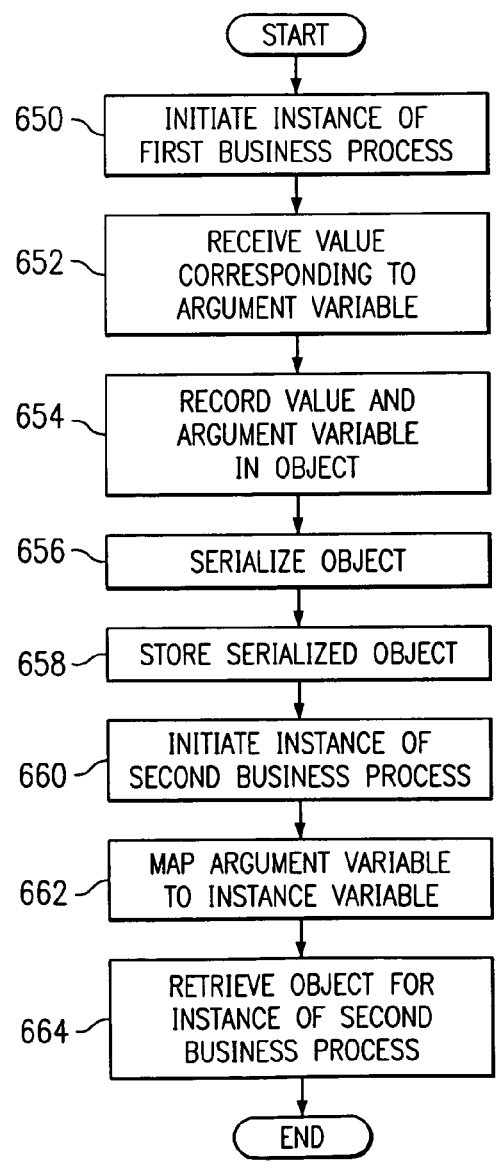

EXECUTING BUSINESS PROCESSES USING PERSISTENT VARIABLES

RELATED APPLICATIONS

This application claims benefit under 35 U.S.C. § 119(e) of U.S. Provisional Application Ser. No. 60/280,622, filed Mar. 30, 2001, entitled "METHOD AND SYSTEM FOR AUTOMATING BUSINESS PROCESSES."

This application is related to U.S. patent application Ser. No. 10/114,585, entitled "DESIGNING BUSINESS PROCESSES USING PARAMETRIC ROLES," filed concurrently with the present application.

This application is related to U.S. patent application Ser. No. 10/114,146, entitled "DESIGNING BUSINESS PROCESSES USING DISTRIBUTED PROCESS FLOWS," filed concurrently with the present application.

This application is related to U.S. patent application Ser. No. 10/114,493, entitled "PUBLISHING AND DEPLOYING BUSINESS PROCESSES," filed concurrently with the present application.

TECHNICAL FIELD OF THE INVENTION

This invention relates generally to the field of business process automation and more specifically to executing business processes using persistent variables.

BACKGROUND OF THE INVENTION

Organizations typically automate their business processes to manage their operations. A business process includes a series of activities that are undertaken to perform the operations of an organization. For example, a business process may describe activities for processing a sales order, such as the steps of receiving a sales order, checking the payment history, checking the inventory, and so on. An organization may automate a business process by having a computer perform some activities such as receiving a sales order. A business process may also be automated by having a computer remind human participants of activities that need to be performed. For example, a computer may send an email message notifying an account manager to check the payment history of a client.

Automating business processes, however, has posed challenges. Designing automated business processes involves the use of software programs, which business process designers may find difficult to use. Moreover, testing automated business processes requires performing trial runs of a business process, which may be difficult to do without disrupting the actual users of the business process. Consequently, automating business processes has posed challenges.

SUMMARY OF THE INVENTION

In accordance with the present invention, disadvantages and problems associated with previous techniques for business process design may be reduced or eliminated.

According to one embodiment of the present invention, executing a business process includes initiating an instance of a business process comprising activities, where the instance has an instance variable. A first activity of the business process is executed, and a value corresponding to the instance variable is received. The instance variable and the value is recorded in an object, and the object is stored in a data repository. A second activity of the business process is executed, and the object is retrieved from the data repository for use with the second activity.

Certain embodiments of the invention may provide numerous technical advantages. A technical advantage of one embodiment is that business processes may include activities with compensation tasks. Compensation tasks are executed when a task of an activity fails to execute, thus allowing for the performance of the activity to continue uninterrupted to completion. Compensation tasks may be used for automated business processes to maintain business process consistency.

Another technical advantage of one embodiment is that an activity may be associated with an abstract role in order to specify users representing people responsible for performing the activity. The association may provide for abstract business process modeling, which may allow for the creation of business process templates creation that may be used for different organizations.

Another technical advantage of one embodiment is that the processes of publishing and deploying business processes are separated. By separating the publication and deployment processes, a business process may be published and tested, without deploying the business process to users. Another technical advantage of one embodiment is that persistent variables are used. Persistent variables allow a value related to an instance of a business process to be efficiently carried from one activity of the business process to another activity of the same business process or of another business process.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and for further features and advantages, reference is now made to the following description, taken in conjunction with the accompanying drawings, in which:

FIG. 1B is a block diagram of one embodiment of a data repository that may be used with the system of FIG. 1A;

FIG. 3 illustrates one embodiment of task table that may be used for recording tasks and compensation tasks for a business process activity;

FIG. 5 is a flowchart illustrating one embodiment of a method for defining, implementing, and executing tasks and compensation tasks;

FIG. 9 is a flowchart illustrating one embodiment of a method for defining and implementing organizational roles;

FIG. 11 is a flowchart illustrating one embodiment of a method for publishing a business process;

FIG. 12 is a flowchart illustrating one embodiment a method for implementing an instance variable at runtime or execution time;

FIG. 13 is a flowchart illustrating one embodiment a method for implementing an argument variable when communicating to business processes;

DETAILED DESCRIPTION OF THE DRAWINGS

Figure 1A:
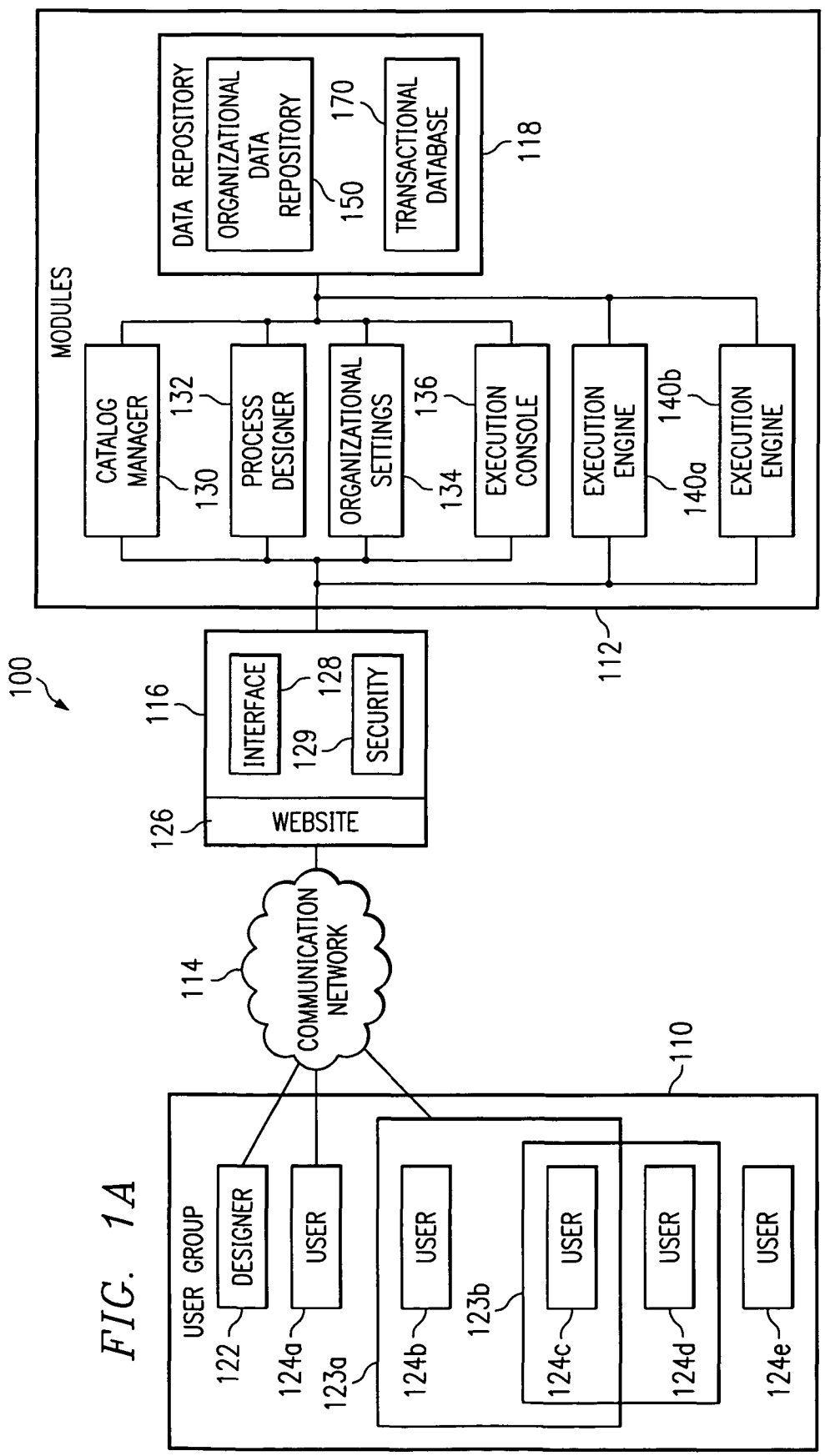
FIG. 1A is a block diagram of one embodiment of a system for automating a business process in accordance with the present invention.

FIG. 1A is a block diagram of one embodiment of a system 100 for automating a business process. A business process includes a series of activities that are undertaken to perform the operations of an organization. For example, a business process may describe activities for processing a sales order, such as the steps of receiving a sales order, checking the payment history, checking the inventory, and so on. System 100 allows an organization to automate business processes.

Referring to FIG. 1A, a user group 110 may access system 100 through a communication network 114. An organization may use system 100 to implement business processes to solve problems. User group 110 comprises a data set of user identifiers, which may represent, for example, people who may access system 100 using computing modules such as personal computers. For example, user group 110 may include a designer 122, which represents a person who uses system 100 to design a business process model.

User group 110 also includes users 124, which represent people who may be responsible for performing activities of a business process. For example, a user 124 may be responsible for receiving a sales order and verifying its completeness. System 100 allows designer 122 to design a business process model. In turn, system 100 notifies users 124 of the activities that need to be performed.

Users 124 may be logically organized into user sets 123, where users 124 of a user set 123 represent people who are responsible for the execution of specific activities. The logical grouping of users may be defined and stored in system 100. A user 124 may be a member of any suitable number of user sets 123. For example, user 124c is a member of user sets 123a and 123b. User sets 125 may be associated with, for example, organizational roles defined within an organization, such as a salesperson role.

Communication network 114 may include wired telecommunications, satellite, microwave, or other suitable wired or wireless networks, or a combination of the preceding.

System 100 includes an interface module 116, modules 112, and a data repository 118. Interface module 116 may include a website 126, an interface 128 deployed in website 126, and a security module 129. Website 126 allows for communication of information between user group 110 and system 100. Interface 128 may comprise a hypertext markup language (HTML) interface that receives instructions through a web server deployed in website 126 in order to perform operations included in instructions from users 124. Security module 129 may provide, for example, password security, resource access security, and/or system security. Security module 129 may be used for authentication procedures and may be adapted to the security policy and infrastructure of an organization.

System 100 provides advantages in automating business processes. System 100 generates business processes that include compensation tasks. A compensation task is executed when an associated task of a business process activity fails to execute, allowing the business process to achieve a steady and consistent state before its execution is retried. The business process instance may proceed to the next business process activity. Additionally, system 100 allows for specification of people who are responsible for performing the activities of a business process through user sets 123 defined in system 100, thus allowing an organization to readily automate the business process.

Moreover, system 100 separates the processes of publishing and deploying business processes. By separating the publication and deployment processes, a business process may be published and tested, without being deployed to users 124 of the production environment. Furthermore, system 100 provides persistent variables, which allow a value to be transferred from one activity to another activity of the same business process or of a different business process using process arguments.

Modules 112 include a catalog manager 130, a process designer 132, an organizational settings module 134, an execution console 136, and execution engines 140 coupled as shown in FIG. 1A. In general, catalog manager 130 may be used to define and specify the components or programs that can be called from a business process. Process designer 132 may be used to model business processes to be deployed in an organization. Organizational settings module 134 may be used as a front-end module to define business process participants and how they are going to be organized.

Execution console 136 may be used to manage the execution engine in which business processes are deployed, and may be accessed by users 124 of user group 110. Execution engines 140 may be used to deploy business processes, execute tasks requested by users 124, and perform automated business process activities. Modules 112 may store and retrieve data using a data repository 118 that includes an organizational data repository 150 and a transactional database 170.

According to one embodiment, catalog manager 130 defines, describes, and organizes components. A component may comprise a modular software routine that has been compiled, and may be used with other components or programs. Catalog manager 130 stores components in data repository 118 and supplies components to process designer 132 and execution engines 140.

Process designer 132 is used to design business processes, which are stored in data repository 118 once the business processes are published. While the business process is being designed using Process Designer 132, the business process model definition may be stored in a local computer. Business processes are described in more detail in connection with FIG. 2. Process designer 132 may also be used to publish business processes to data repository 118 as well as to deploy business processes to execution engine 140.

According to one embodiment, business processes are designed on a computer by manipulating graphical icons on a computer screen. An example of a computer screen that may be used to design a business process is described in connection with FIG. 2.

Figure 2:
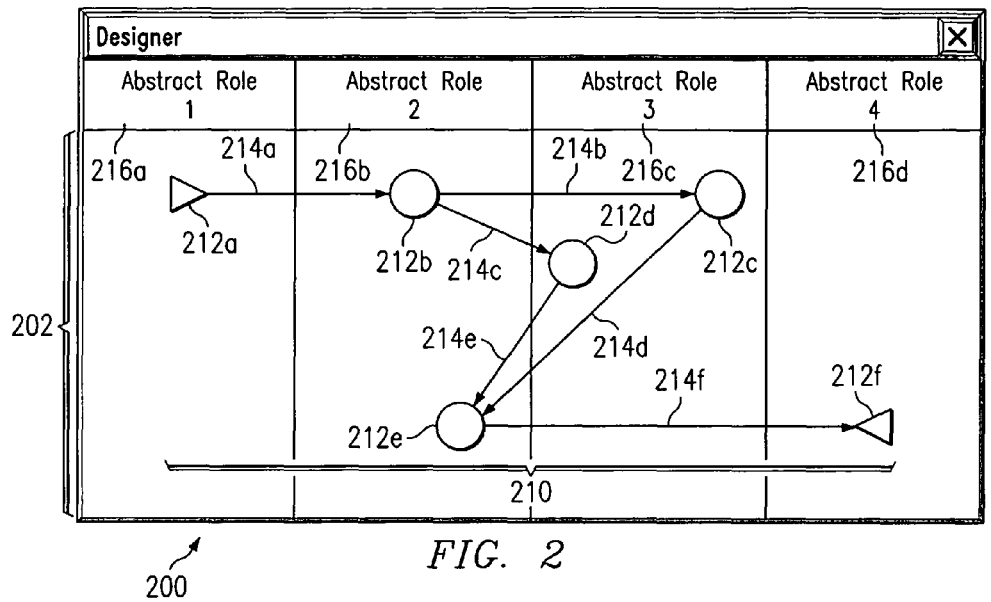
FIG. 2 illustrates one embodiment of designer screen that may be used for automating business process modeling.

FIG. 2 illustrates one embodiment of a designer screen 200 for automating a business process 210 on a computer. Business process 210 includes a sequence of activities 212 coupled by transitions 214. For example, business process 210 may include a sequence of activities 212 for processing a sales order. Each activity 212 comprises a series of tasks that are executed to complete activity 212. For example, an activity 212 that notifies a client of an incomplete sales order may include the task of "sending an email message to the client."

Tasks may execute components catalogued using catalog manager 130 and made available through publishing and deployment.

To design business process 210, activities 212 are placed in a designer window 202. Activities 212 may have a specific semantic, which may be designated by a particular color or shape. Custom colors and shapes may be used in response to user preference. For example, activity 212a may be an activity that is used to begin a business process, and may be designated by a triangular shape pointing in the right-hand direction. Activity 212f may be an activity that is used to end a business process, and may be designated by a triangular shape pointing in the left-hand direction.

Transitions 214 are used to indicate a next activity that is to be initiated after executing a previous activity. For example, transition 214a indicates that activity 212b is to be initiated after the execution of activity 212a. Transitions 214 may indicate multiple next activities that are to be initiated after the execution of a previous activity. For example, transitions 214b and 214c indicate that activities 212c and 212d, respectively, are to be initiated after the execution of activity 212b.

Depending upon how business process 210 is defined, either one or both activities 212c and 212d may be initiated after activity 212b. For example, business process 210 may be defined such that depending upon a decision made at activity 212b, either activity 212c or activity 212d is initiated after the execution of activity 212b. Additionally, transitions 214 may direct multiple activities to a single next activity. For example, transitions 214d and 214e direct activities 212c and 212d, respectively, to activity 212e.

Business process 210 also includes abstract roles 216 that are used at design time to represent in the abstract user sets 123 that represent people of an organization who are responsible for performing an activity 212. Abstract role 216 may be matched to an organizational role. An abstract role represents in the abstract a set of users responsible for performing the activity, and the organizational role may take on values that correspond to actual users 124 of an organization. For example, an abstract role represents a salesperson in the abstract, and the organizational role describes actual salespeople of an organization. At design time, abstract roles are used instead of organizational roles, such that a single business process may be used for multiple organizations, incorporating the concept of template models.

An organizational role may be parametric, that is, the organizational role may be assigned a value that corresponds to user set 123, and may take on multiple values that correspond to different user sets 123. Users 124 of user set 123 represent people responsible for performing activity 212. For example, users 124 of one user set 123 may represent salespeople from one state, and users of another user set 123 may represent salespeople from another state. An organizational role may be used to create groups of users that can be instantiated with, for example, salespeople from different states. An advantage of defining parametric roles is that the assignment of a user set 123 may be determined dynamically based on business process rules.

Abstract roles 216 are specified for activities 212 by placing activities 212 in the appropriate abstract role column. For example, abstract role 216a is specified for activity 212a, and abstract role 216b is specified for activities 212b and 212e. To summarize, business process 210 may include activities 212 coupled by transitions 214 and associated with abstract roles that may be associated with real organizational roles stored in data repository 118.

Referring back to FIG. 1A, organizational settings module 134 defines the settings for an organization. Organizational settings may describe user sets 123, organizational roles and associated values if the organizational roles are parametric, and organizational units of the organization.

Execution engines 140 manage the execution of instances of business processes 210. An example of an instance of a business process may be processing a specific sales order using a business process for processing sales orders. Execution engine 140 is used to execute an instance of business process 210 that has been deployed on it. Execution engine 140 retrieves and collects business process 210 definitions from organizational data repository 150. Execution engine 140 manages the execution of a particular task of a specific business process instance requested by a user 124 if the activity is interactive. Execution engine 140 automatically executes the task if the activity is an automated one.

The state of the instance is maintained in transactional database 170 if the task is completed successfully. Each execution engine 140 may be associated with its own transactional database 170 that may comprise, for example, a relational database management system (RDBMS). "Each" as used in this document means either each member of a set or each member of a subset of a set.

Execution console 136 defines and manages execution engines 140. For example, execution console 136 defines port settings for execution engines 140 and database settings for transactional databases 170 associated with execution engines 140.

FIG. 1B is a block diagram of one embodiment of data repository 118 of system 100 of FIG. 1A. Data repository includes organizational data repository 150 and transactional database 170. Organizational data repository 150 includes information that is typically maintained through multiple executions of instances of business processes, and may be received from organizational settings 134 and execution console 136. Organizational data repository 150 may comprise, for example, a lightweight directory access protocol (LDAP) database.

Organizational data repository 150 includes business process definitions 152 and organizational data 154. Business process definitions 152 include activities, transitions between the activities, and abstract roles associated with the activities. Business process definitions 152 may include a task table 159 that records the tasks of an activity and their associated compensation tasks. A compensation task is executed when its associated task fails to execute. The compensation task undoes things done by the associated task to a particular business process activity, resulting in a consistent state in case a task fails. Task table 159 is described in more detail in connection with FIG. 3.

Organizational data 154 includes information about the organization. Organizational roles 160 include information about organizational roles and associated users 124. Organizational roles 160 are matched with abstract roles 216 in order to specify users 124 representing people who are responsible for performing the activities of business processes definitions 152. Matchings 164 record the association between abstract roles and corresponding organizational roles when publishing a particular business process using system 100.

Transactional database 170 includes persistent variables that record information that is typically maintained for an instance of a business process. For example, a value describing the requested quantity of goods for a specific sales order is typically maintained for the instance that processes the specific sales order. The value is generally not needed for instances that process other sales orders.

Persistent variables include instance variables 172 and argument variables 174. Instance variables 172 record values that may be passed from one activity of a business process to another activity of the same business process. Instance variables 172 may maintain the state of the instance within the context of a business process. For example, an instance variable may maintain the activity where an instance is at a given moment in time during the lifetime of the instance in a business process. Argument variables 174 record values that may be passed from one business process to another business process. Methods for implementing and using persistent variables are described in more detail in connection with FIGS. 12 and 13.

System 100 provides advantages in automating business processes 210. Business processes 210 may include activities 212 with tasks associated with compensation tasks. Compensation tasks are executed when an associated task of activity 212 fails to execute, thus allowing for a consistent state. Compensation tasks are described in more detail in connection with FIGS. 3, 4, and 5. Additionally, activities 212 may also be associated with abstract roles that are used to specify users 124 representing people who are responsible for performing the activity 212, thus allowing an organization to readily automate business processes 210. Organizational roles are described in more detail in connection with FIGS. 7, 8, and 9.

Moreover, system 100 separates the processes of publishing and deploying business processes 210. Business process 210 is published by matching abstract roles with organizational roles to specify users 124 representing people responsible for performing the activities of the business process 210. After publishing, business process 210 may be tested in a testing environment. The tested business process 210 is then deployed to make business process 210 available to users 124 of a production environment. By separating the publication and deployment processes, business process 210 may be published and tested, without deploying business process 210 to users 124 of the production environment, thus reducing risk of problems in the production environment. Publication and deployment of business processes 210 are described in more detail in connection with FIGS. 10 and 11.

Furthermore, system 100 provides persistent variables, which allow a value related to an instance to be carried from one activity to another activity within the same business process or between different business processes. Persistent variables are described in more detail in connection with FIGS. 12 and 13.

Compensation Tasks

FIG. 3 illustrates one embodiment of a task table 300 that records tasks 310 and compensation tasks 312. Activity 212 includes a sequence of tasks 310 that are performed in order to complete activity 212. Activity 212 may describe, for example, notifying a client of an incomplete sales order. Tasks 310 may be written in any suitable computer language and may invoke components implemented in a different computer programming language such as C, C++, Fortran, Cobol, or Basic.

A task 310 may be associated with a compensation task 312 that is specified to be executed in task 310. Compensation task 312 is only executed if its associated task fails. For example, Task 1, which may represent "send email message to the client and to the financial department" is associated with compensation Task 3, which may represent "send a disregarding email message to the client if the email message could not be sent to the financial department". Task 3 is performed if Task 1 fails. A task 310 is not required to have a compensation task 312. For example, Task 2, which may be "send a fax to the client," has no associated compensation task 312. Recording tasks 310 and associated compensation tasks 312 in task table 300 provides for efficient and organized storage of tasks 310 and compensation tasks 312.

Figure 4:
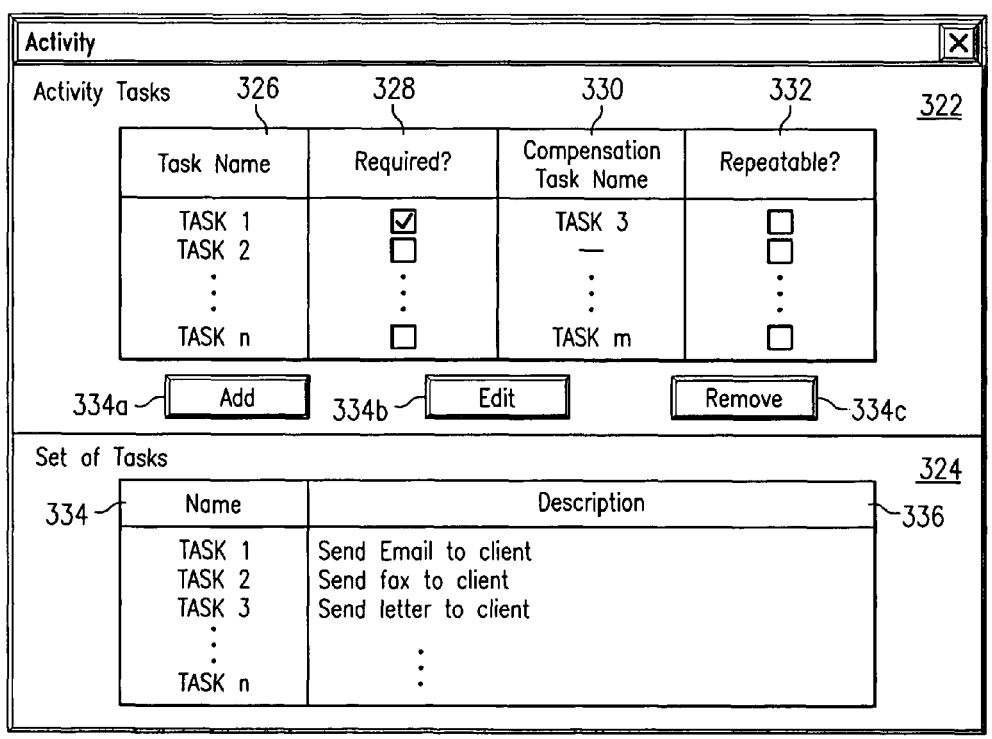
FIG. 4 illustrates one embodiment of an activity properties screen that may be used to define tasks and compensation tasks.

FIG. 4 illustrates one embodiment of an activity properties screen 320 or task definition screen, that may be used to define tasks 310 and compensation tasks 312 of activity 212. Activity properties screen 320 includes an activity tasks section 322 and a set of available tasks section 324.

Activity tasks section 322 includes windows 326 and 330 and boxes 328 and 332 that may be used to define tasks 310 and compensation tasks 312 of activity 212. To define a task 310, the name of task 310 may be inserted in task name window 326, and a required box 328 may be selected in order to indicate that task 310 is mandatory to complete an instance of activity 212. A mandatory task may comprise a task that must be completed in order to route an instance from one activity to another activity. In one embodiment, mandatory tasks must be completed in order to route an instance from one activity to a next activity to continue execution of activity 212. In the illustrated example, Task 1, "send an email message to the client and to the financial department" must be completed in order to continue execution of activity 212.

Compensation task 312 may be defined by inserting the name of compensation task 312 into compensation task name window 330, and a repeatable 332 box may be selected in order to indicate that task 310 may be repeated a number of times. An add button 334a, an edit button 334b, and a remove button 334c may be used to add, edit, or remove tasks 310 from activity 212. When a task is added, the new task appears in task name window 326.

Tasks 310 and compensation tasks 312 for activity 212 may be selected from set of tasks section 324. Set of tasks section 324 includes a name window 334 and a description window 336 that lists the names and descriptions, respectively, of available tasks that may be selected for activity 212. Activity properties screen 320 allows designer 122 using Process Designer 132 to readily specify tasks 310 and associated compensation tasks 312 of activity 212, thus providing for efficient design of business processes 210.

FIG. 5 is a flowchart illustrating one embodiment of a method for defining and implementing tasks 310 and compensation tasks 312 of activity 212. In the illustrated example, Task 1, which is "send an email message to the client and to the financial department" is associated with compensation Task 3, which is "send a disregarding email message to the client if the email message could not be sent to the financial department". Task 3 is performed if Task 1 fails, that is, if the email message cannot be sent to the financial department, then a disregarding email message is sent to the client.

The method begins at step 350, where process designer 132 displays activity properties screen 320, which may be used to generate tasks for activity 212. Activity properties screen 320 may be displayed in response to a user request through process designer 132. A user may, for example, click on activity 212 of designer screen 200 of FIG. 2 to request activity properties screen 320.

Activity properties screen 320 may be used to specify tasks 310 and associated compensation tasks 312 of activity 212. In the illustrated example, Task 1 is "send an email message to the client and to the financial department" and Task 3 is "send disregarding email message to the client if the email message could not be sent to the financial department". At step 352, tasks 310 and associated compensation tasks 312 are defined. Tasks 310 and associated compensation tasks 312 are stored in task table 159 of organizational data repository 150 at step 354.

At step 356, an instance of activity 212 is requested to initiate execution of a task 310. If activity 212 is interactive, then the request is received from user 124. If activity 212 is automatic, then execution engine 140 initiates the execution of task 310. A task 310, for example, Task 1, of activity 212 is initiated by execution engine 140 at step 358, that is, an email message is sent to the client and to the financial department.

Execution engine 140 may determine that Task 1 has failed at step 360. Execution engine 140 may, for example, receive a notification that a program responsible for executing Task 1, such as an email software program, cannot be located. Execution engine 140 determines compensation task 312 associated with task 310 from task table 159. In the illustrated example, task table 159 of FIG. 3 specifies that Task 3 is the compensation task 312 associated with Task 1.

At step 364, execution engine 140 initiates compensation task 312 to compensate for failed task 310. In the illustrated example, Task 3 may be initiated by sending a disregarding email message to the client. After initiating compensation task 312, the method terminates. Thus, the method provides for efficient specification of compensation tasks 312 that are executed in the event an associated task 310 fails to execute.

Parametric Roles

Figure 6:
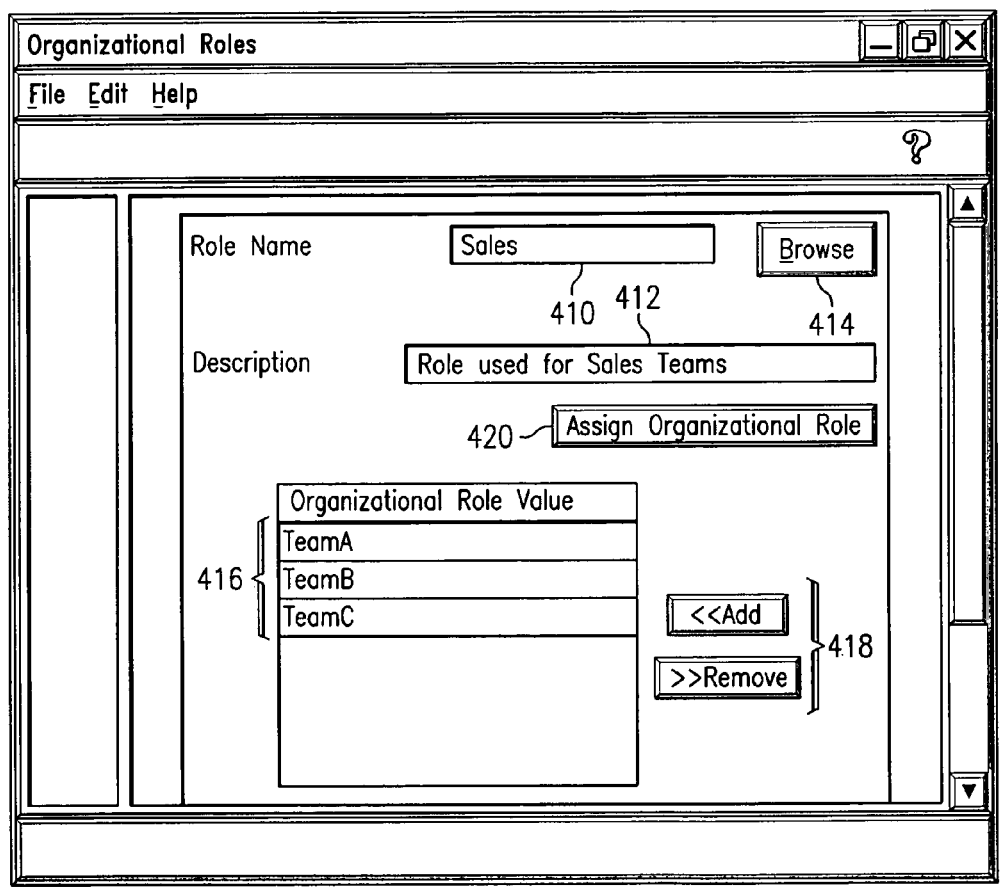
FIG. 6 illustrates one embodiment of an organizational roles screen that may be used to configure organizational roles that can have values.

FIG. 6 illustrates one embodiment of an organizational roles screen 400 that may be used to define organizational roles and associated values for an organization. The organizational roles and associated values may be stored in organizational data repository 150. Organizational roles are matched with abstract roles of activity 212 when a business process model is published into an organization. An organizational role may group users 124 with the same responsibility such that users 124 associated with an organizational role may perform the same operations or functions. For example, multiple users 124 may have the ability to perform the same activity 212.

An organizational role may be parametric, that is, may take on values that may be associated with categories such as subsets of the group with which the organizational role is associated. For example, an organizational role associated with a sales role may take on values associated with sales team categories within the sales role.

Users 124 may be associated with organizational units in order to designate other groupings of users 124, for example, groupings by department or location. Organizational units may be associated with divisions or departments within an organization context. Information about the organizational units may be stored in organizational data repository 150. For example, an organizational unit may be associated with a particular department such as a sales department or a particular office location such as a Dallas office location.

Organizational units may be used to group users 124 that may access published and deployed business processes. For example, an organization develops a business process for processing a sales order that deals with operations in a sales department and no other department. The business process may be published and deployed to an organizational unit associated with the sales department such that only users 124 of this particular organizational unit, and no other users 124, may access the business process.

A value may also be associated with a time period. For example, an organization may have one value for telephone operators who work during a daytime period, and another value for telephone operators who work during a nighttime period. An instance of activity 212 that occurs during a particular time period may be assigned the value corresponding to the time period. For example, an instance that occurs during a daytime period may be assigned the value for telephone operators who work during a daytime period. An organizational role that has no specified value is assigned a default value.

An advantage of the parametric roles may be that only one activity may be needed for multiple parametric values, thus avoiding the need to specify multiple activities for multiple values. Another advantage may be that a user set 123 associated with an instance may be determined dynamically based on business process rules.

Organizational roles screen 400 includes a role name window 410 and a description window 412, where a name and a description, respectively, of an organizational role may be inserted. In the illustrated example, an organizational role, Sales, is described as an organizational role for sales teams. A browse button 414 may be selected in order to view available organizational roles.

Value windows 416 may be used to define values that the organizational role may have if the organizational role is parametric. In the illustrated example, Team A, Team B, and Team C, are the defined values that the Sales may have. Add and remove buttons 418 may be used to add and remove, respectively, values. An assign organizational role button 420 may be used to display assign organizational roles screen that may be used to assign roles to users 124, which is described in more detail in connection with FIG. 7.

Figure 7:
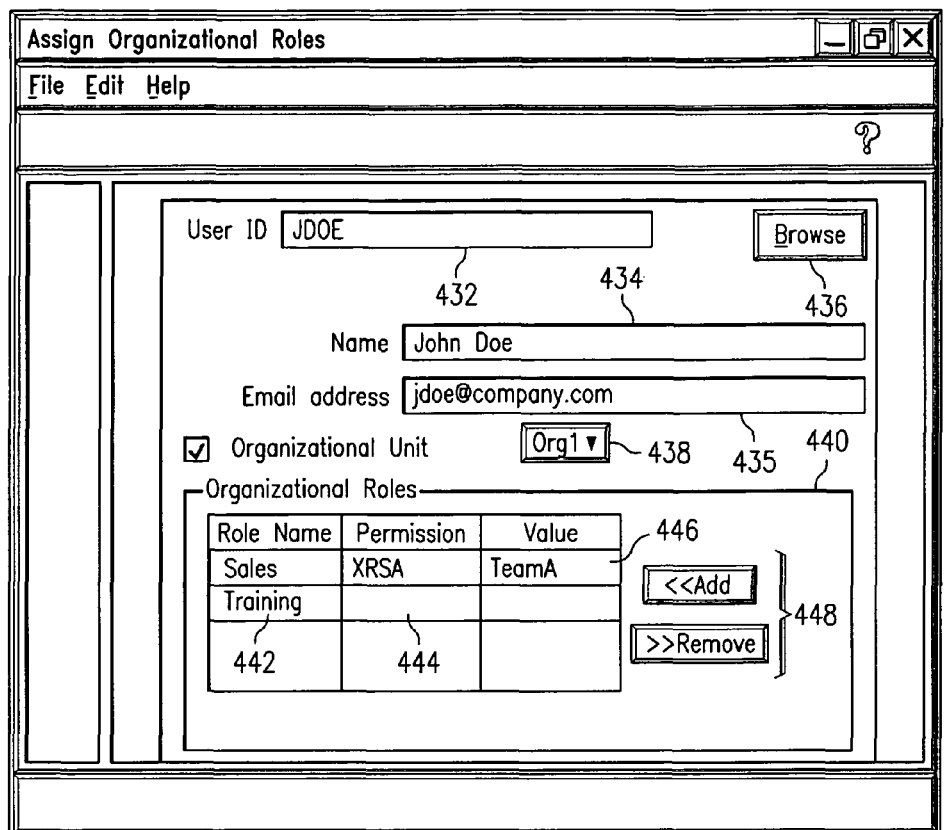
FIG. 7 illustrates one embodiment of assign organizational roles screen that may be used to assign organizational roles to users.

FIG. 7 illustrates one embodiment of an assign organizational roles screen 430 that may be used to assign organizational roles and values to users 124. The organizational roles and values may be stored in organizational data repository 150. Organizational roles are assigned to users 124 in order to create user sets 123 corresponding to the organizational roles.

A user I.D. window 432, a name window 434, and an email address window 435 may be used to specify user 124 by inserting the user identification, name, and email address, respectively, of user 124. A browse button 436 may be used to view a list of available users 124. An organizational unit button 438 may be used to select an organizational unit 162 for user 124 referenced in user I.D. window 432. The information may be stored in organizational data repository 150.

An organizational roles section 440 may be used to define organizational roles assigned to user 124. Role name windows 442 and value windows 446 may be used to specify organizational roles and values for parametric organizational roles, respectively, assigned to user 124. In the illustrated example, a Sales role having Team A value, and a Training role are specified for JDOE.

Permission windows 444 are used to specify the actions a user may perform in a specified role. Possible permissions may include: execute task, abort instance, suspend instance, and route instance. The permission may be assigned to a particular user 124, which may provide for different users 124 associated with the same organizational role having different permissions.

Add and remove buttons 448 may be used to add or remove, respectively, organizational roles. Organizational roles screen 400 and assign organizational roles screen 430 thus allow for efficient specification of organizational roles, values, and user sets 123. According to one embodiment, organizational settings module 134 may be used to define and configure users 124, organizational roles 160, and organizational units 162.

Figure 8:
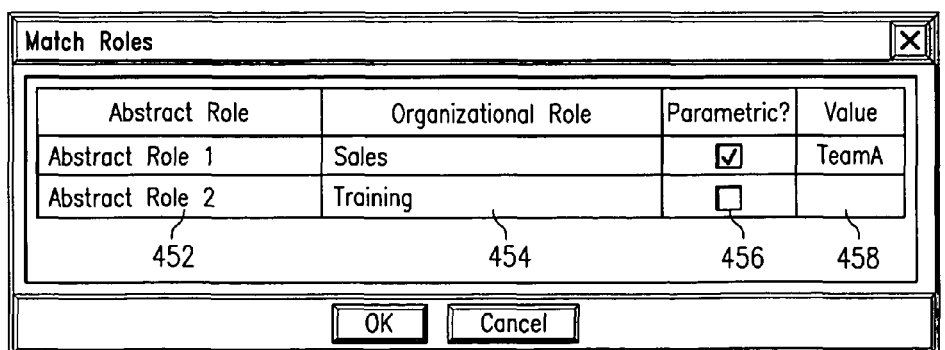
FIG. 8 illustrates one embodiment of a match roles screen that may be used to match abstract roles with organizational roles when an abstract business process model is published to an organization.

FIG. 8 illustrates one embodiment of a match roles screen 450 that may be used to match abstract roles with organizational roles when a business process is published into an organization. Match roles screen 450 includes abstract role windows 452 and organizational roles windows 454 that may be used to specify the abstract roles and organizational roles to be matched. In the illustrated example, Abstract Role 1 is matched with a Sales organizational role, and Abstract Role 2 is matched with a Training organizational role.

Parametric boxes 456 may be used to specify whether a role is parametric. Software based on the abstract role definition may be used to determine whether a role is parametric. If an organizational role is parametric, value windows 458 may be used to specify a value for the organizational role. In the illustrated example, a Team A value is specified for Sales, and nothing is specified for Training.

FIG. 9 is a flowchart illustrating one embodiment of a method for defining and implementing organizational roles. In the illustrated example, assign organizational roles screen 430 is used to assign Sales and Training roles to user 124 JDOE. Match roles screen 450 is used to match abstract roles of business process 210 with organizational roles defined in organization data repository 150. After role matching has been performed, user 124 JDOE may have access to activities 212a, 212b, and 212e because user 124 JDOE has been assigned the Sales and Training roles. As a result, user 124 JDOE is allowed to participate in the execution of activities 212a, 212b and 212e.

The method begins at step 462, where an activity 212 is associated with an abstract role. An abstract role is created using process designer 132. Once the abstract role has been created, activity 212 can be located within the abstract role location. In this case, activity 212 belongs to a specific domain delimited by the abstract role. Activity 212 may be defined and abstract role may be specified using designer screen 200 of FIG. 2. Activity 212 and the associated abstract role are stored with business process 210 in organization data repository 150.

Organizational roles are added at step 464 using organizational settings module 134. Organizational roles screen 400 may be used to generate a request to define organizational roles. Values may be specified for a parametric organizational role. At step 466, users 124 are assigned to organizational roles. The assignment specifies the activities for which users 124 may participate in the execution. In the illustrated example, Sales and Training are specified for user 124 JDOE. Values may be specified for organizational roles that are parametric. In the illustrated example, a Team A is specified for Sales, and no value is specified for Training since Training is not parametric. At step 468, organizational settings module 134 stores the organizational notes and corresponding users 124 in organization data repository 118.

Business process 210 may be published at steps 472 and 474 using process designer 132 or execution console 136. Match roles screen 450 to generate a request to match abstract roles with organizational roles is displayed. A user 124 such as an administrator may use match roles screen 450 to generate a request matching the abstract role and the organizational role. The request is received at step 472. The abstract role and the organizational role are matched and stored at step 474. In the illustrated example, Abstract Role 1 is matched with Sales, and Abstract Role 2 is matched with Training. The matching is stored in organization data repository 150.

At step 476, execution engine 140 receives a request from user 124 to determine activities 212 that user 124 has access or authorization to process. User 124 is validated and is connected to execution engine 140. Execution Engine 140 determines the organizational role or roles associated with user 124 at step 477.

At step 478, execution engine 140 identifies activities that user 124 is allowed to access. If the organizational role is not parametric, user 124 may access activities associated with the organizational role assigned to user 124. If the organizational role is parametric, the user 124 may access instances associated with values assigned to user 124. User 124 is granted access to the allowed activities at step 480. After granting access, the method terminates.

Organizational roles screen 400, assign organizational roles screen 430, and match role screen 450 allow for easy specification and matching of abstract roles and organizational roles. Thus, the method provides for efficient definition of users 124 responsible for performing activities 212 of business process 210.

Publication and Deployment

Figure 10:
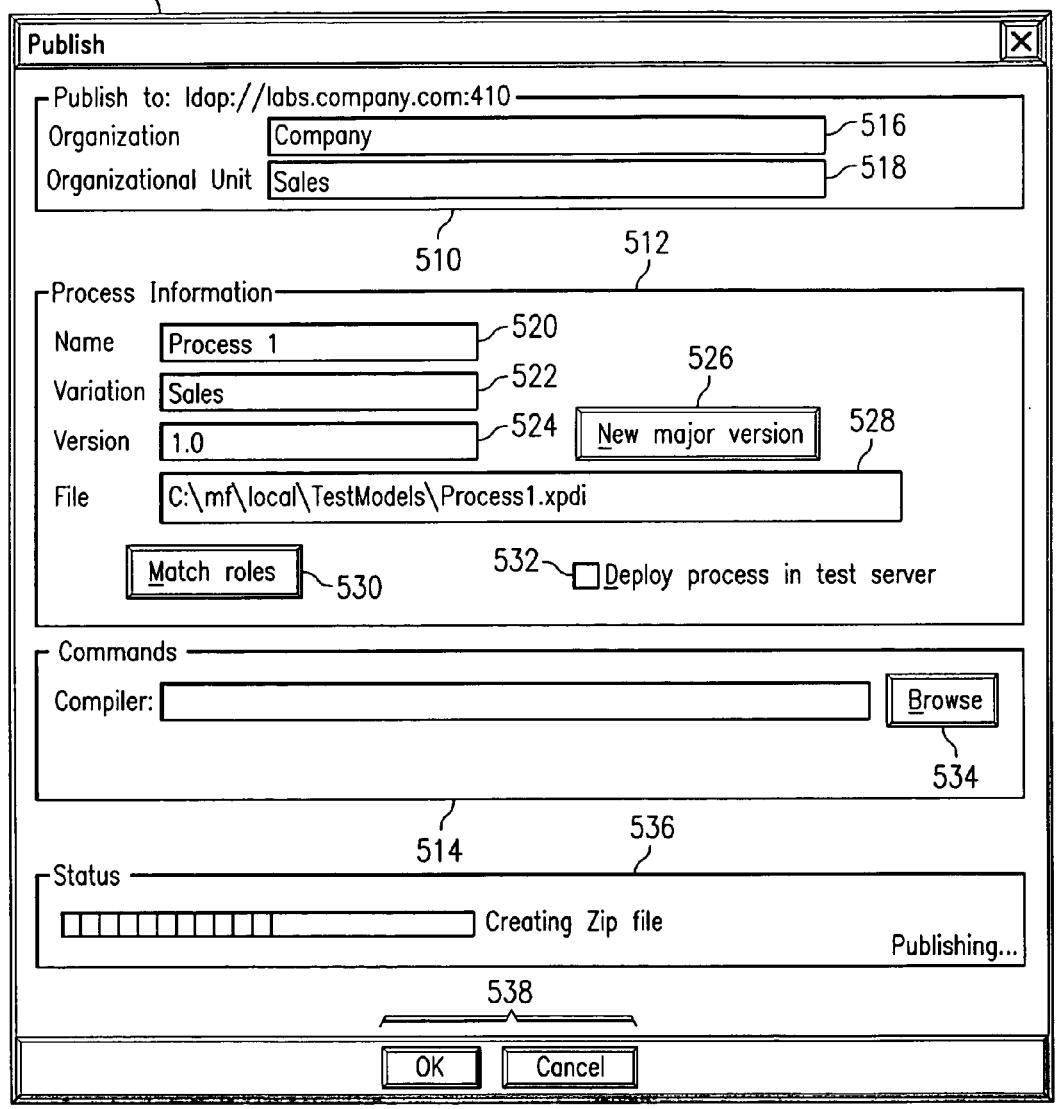
FIG. 10 illustrates one embodiment of a publish screen that may be used to publish and deploy a business process.

FIG. 10 illustrates one embodiment of a publish screen 500 that may be used to publish business process 210. Process designer 132 and execution console 136 publish business process 210 to organization data repository 150 by matching abstract roles with organizational roles, and then storing the matched abstract roles and organizational roles in organization data repository 150. Metadata and the structure of the business process model may also be stored in organization data repository 150. Metadata describes a graphical representation of the business process model.

After publication, business process 210 may be deployed into a testing environment before deploying business process 210 to users 124 of a production environment. Process designer 132 and execution console 136 displays publish screen 500 in order to match the abstract roles with the organizational roles.

Publish screen 500 includes a "publish to" section 510, a process information section 512, and a commands section 514. "Publish to" section 510 is used to specify the organization and organizational unit 162 for which business process 210 is to be published. Publish to section 510 includes an organization window 516 and an organizational unit window 518, where names of the organization and organizational unit 162, respectively, may be placed. Users 124 of organizational unit 162 specified in "publish to" section 510, for example, a Sales organizational unit, may be granted access to business process 210 after deployment of business process 210 to a production environment.

Process information section 512 includes a name window 520 that displays a name of business process 210 to be published, for example, Process 1. A variation window 522 is used to show the variation of the business process to be published. The variation may describe, for example, a business process published to a specific organizational unit 162. Variations may be used if variations of the same business process are to be used in the same organization. For example a business process may be implemented one way in Region 1 and may be implemented another way in Region 2. Conceptually, the business processes do the same thing, but are implemented differently.

Version window 524 displays the version of the variation of business process 210 to be published. The version number may track the number of times business process 210 has been published. For example, a version number "1.3" may indicate that a first version of the business process has been published three times. A new major version button 526 may be selected in order to adjust the version number to show that the business process to be published is a new major version. For example, version number "2.0" may be used to indicate a new major version over version number "1.0".

A file window 528 is used to specify business process model location, for example, a computer associated with designer 122. A match roles button 530 may be used to display match roles screen 450 that may be used to match abstract roles with organizational roles in a manner substantially similar to the method described in connection with FIG.

9. A deploy process in test server box 532 may be selected in order to deploy business process 210 to a test environment automatically after publication.

Commands section 514 may be used to specify additional commands, for example, a JAVA compiler program used to generate business process metadata when publishing business process 210. A browse button 534 may be selected to list available commands that may be inserted into commands section 514. A status window 536 shows the status of the publication process. Okay and cancel buttons 538 may be used to submit or cancel, respectively, a request to publish business process 210.

FIG. 11 is a flowchart illustrating one embodiment of a method for publishing business process 210. In the illustrated example, publish screen 500 is used to publish Process 1 destined for a Sales organization unit 162 in order to test Process 1. Process 1 is deployed to allow users of the Sales organizational unit 162 access to Process 1.

The method begins at step 560, where process designer 132 displays publish screen 500. Publish screen 500 is used to generate a request to publish business process 210 to organization data repository 150. In the illustrated example, Process 1 is published for a Sales organizational unit 162. Publish screen 500 is also used to access match roles screen 450 to generate a request to match abstract roles and organizational roles. In response to the request, process designer 132 matches abstract roles and organizational roles at step 562.

At step 564, process designer 132 initiates publication generating a suitable object-based code such as Java code for the tasks of activities 212 of business process 210. The code is then compiled using a suitable compiler such as a Java compiler. The code may also be packaged and compressed by using a suitable compression method such as zip compression. At step 566, process designer 152 completes publication by storing the code and the material abstract roles and organizational notes in organization data repository 150.

At step 568, the method determines whether business process 210 is to be deployed to a testing environment. Designer 122 of the organization may inspect and test published business process 210 in a test environment to determine whether it is ready for deployment. If business process 210 is not ready for deployment at step 568, the method terminates.

If business process 210 is ready for deployment at step 568, the method proceeds directly to step 574. At step 574, business process 210 is deployed to organizational unit 162 using execution engine 140 specified at step 560. Users of organizational unit 162 may be granted access to business process 210 after deployment. After deploying business process 210, the method terminates. To summarize, the method provides for publication of business process 210 that allows for inspection and testing of business process 210 without deployment of business process 210 to a production environment.

Persistent Variables

FIG. 12 is a flowchart illustrating one embodiment of a method for implementing an instance variable, a type of persistent variable. An instance variable allows for a value associated with an instance of business process 210 to be transferred from one activity 212 to another activity 212 of business process 210. Business process 210 may include, for example, activities 212 for processing a sales order, and the instance may describe the processing of a specific sales order. The instance is associated with an instance variable, which may describe, for example, a requested quantity of goods for that particular sales order.

The method begins at step 610, where an instance of business process 210 is initiated. A first activity 212a of business process 210 is executed at step 612. At step 614, a value corresponding to the instance variable is received. The value may describe a quantity of goods. Execution engine 140 records the value and the instance variable in objects at step 616. The objects may comprise, for example, a Java object. The objects are serialized at step 618 so that the objects can be persisted in a data repository. A serialization mechanism may be used for complex structures. At step 620, the objects are stored in transactional data repository 118.

At step 622, a second activity 212b of business process 210 is executed. Activity 212b may require the value for the instance variable that was received during execution of first activity 212a. At step 624, the objects that record the value are retrieved from transactional data 170 for use by second activity 212b. To determine the value previously set in activity 212a, the value retrieved from transactional database 170 may be deserialized to be read by the task in second activity. After retrieving the objects, the method terminates.

FIG. 13 is a flowchart illustrating one embodiment of a method for implementing an argument variable, another type of persistent variable. An argument variable allows for a value to be transferred from one business process 210a to another business process 210b. For example, a first business process 210a may describe processing sales orders, and an instance may describe processing a specific sales order. The instance is associated with an argument variable that describes, for example, a requested quantity of goods for the particular sales order. A second business process 210b may describe determining the inventory of a type of goods, and may require information about quantities of goods requested by sales orders. An argument variable allows for information about requested quantities of goods to be transferred from first business process 210a to second business process 210b.

The method begins at step 650, where an instance of first business process 210a is initiated by execution engine 140 with a value for a process instance variable as described in FIG. 12. First business process 210a, includes an activity that connects first business process 210a with second business process 210b. An instance variable of first business process 210a is associated with an argument variable used to send a value to second business process 210b. At step 652, a value corresponding to the argument variable is received. The value may describe a quantity of goods. The value for the corresponding argument variable is recorded in objects. The objects may comprise, for example, a Java object. The objects are serialized at step 656 for recording the objects in a data repository. At step 658, the serialized objects are stored in transaction database 170 of data repository 118.

At step 660, a process instance variable of second business process 210b is initiated with a default value. At step 662, the argument variable of first business process 210a is mapped to the instance variable of second business process 210b and persisted in transactional database 170. At step 664, the objects that record the value for process instance variable are retrieved from transactional data 170 for use by the instance of second business process 210b. After the objects are retrieved, the method terminates.

Embodiments of the present invention provide advantages for automating business processes 210. Business processes 210 may include activities 212 with compensation tasks 312. Compensation tasks 312 are executed when an associated task 310 of activity 212 fails to execute. Additionally, an activity 212 may be associated with an abstract role to efficiently specify users 124 representing people who are responsible for performing the activity 212.

Moreover, the processes of publishing and deploying business processes 210 are separated. By separating the publication and deployment processes, business process 210 may be published and tested, without deployment of business process 210 to organizational unit 162. Furthermore, system 100 provides persistent variables, which allow a value related to an instance to be carried from one activity to another activity. Consequently, embodiments of the present invention provide effective and efficient systems and methods for automating business processes 210.

Distributed Process Flow

FIGS. 14 through 18 illustrate embodiments of distributed process flow. Distributed process flow provides for the definition of distributed processes, which may improve process design and implementation. Distributed process flow may be applied to any suitable software program.

According to one embodiment, distributed process flow is applied to a business designer 700. According to the illustrated example, business designer 700 offers the following distributed features: asynchronous process creation, synchronous process creation, process-to-process notification, external notification to processes, and process interruption. Distributed process flow may be applied to any procedure, for example, process modularization, logical distribution of implementable processes, task parallelization, or notification between processes.

Asynchronous Process Creation

Figure 14:
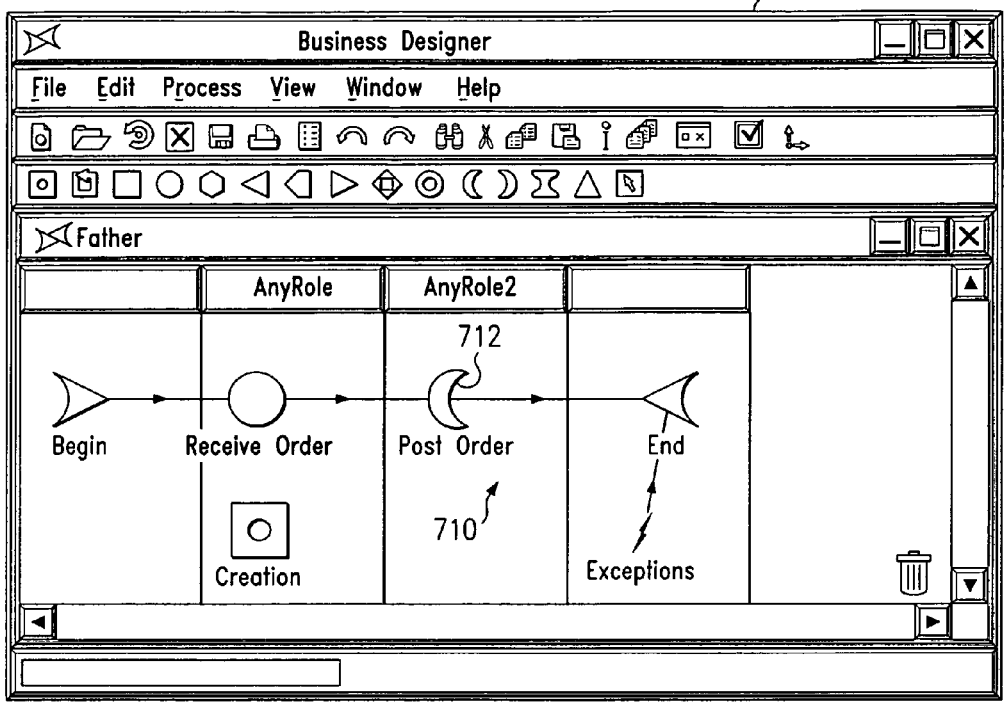
FIGS. 14 through 18 illustrate distributed process flow.

FIG. 14 illustrates an example of asynchronous process creation, which may be called non-blocking process creation. Asynchronous process creation allows for a first business process to create an instance in a second business process represented by an activity of the first business process. According to one embodiment, instance creation is requested by a parent business process 710, and the instance is created in a child business process 712.

An instance of parent business process 710 is not required to wait for an instance in child business process 712 and may continue flowing through parent business process 710. Both instances may run concurrently in business processes 710 and 712. An asynchronous instance creation may occur in the same business process 710, which involves calling business process 710 recursively.

In the illustrated example, once an order is received and processed in a Father parent process 710, the order is sent to Post Order child process 712 for further processing. Post Order child process 712 is represented by a process creation activity. Father parent process 710 is not required to wait until order processing in Post Order child process 712 is completed.

Each business process 710 and 712 may have incoming parameters, known as incoming arguments. When an instance is created asynchronously in child business process 712, parameters are passed to child business process 712.

Synchronous Process Creation

Figure 15:
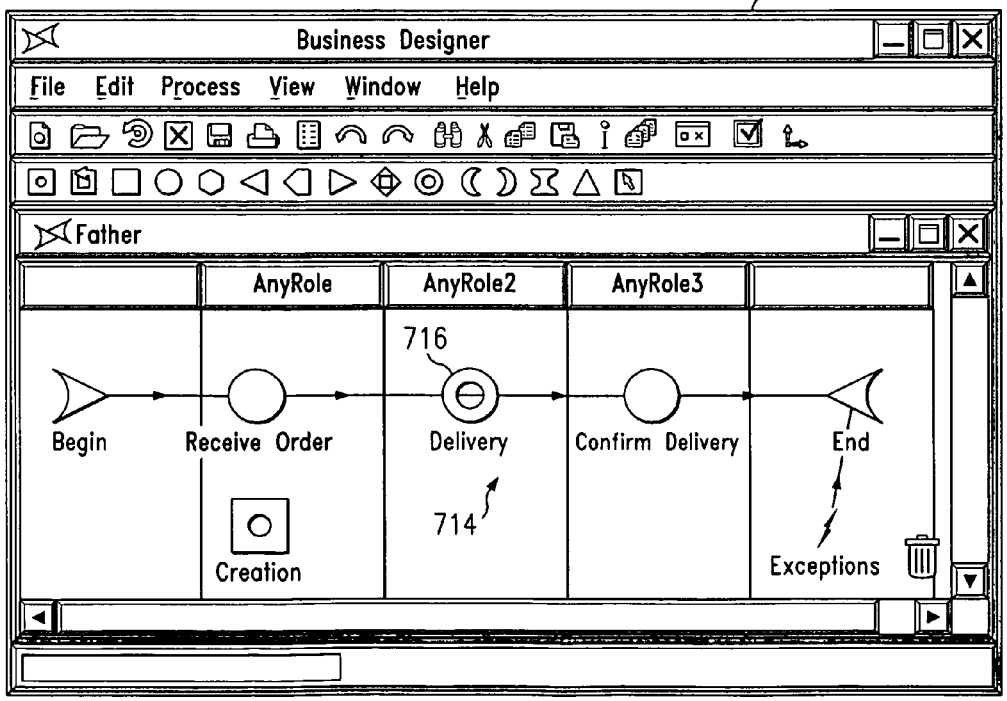

FIG. 15 illustrates an example of synchronous process creation, which may be called blocking process creation. Synchronous process creation is similar to asynchronous process creation, however, an instance in a parent business process 714 waits until an instance in a child business process 716 is complete. Once the instance of child business process 716 is complete, the instance in parent business process 714 continues to flow through parent business process 714. When an instance is created synchronously in child business process 714, arguments are passed to child business process 714.

In the illustrated example, Father parent process 714 waits for a response from Delivery child process 716 to confirm successful delivery of goods stated in the order.

Process-to-Process Notification and External Notification

Figure 16:
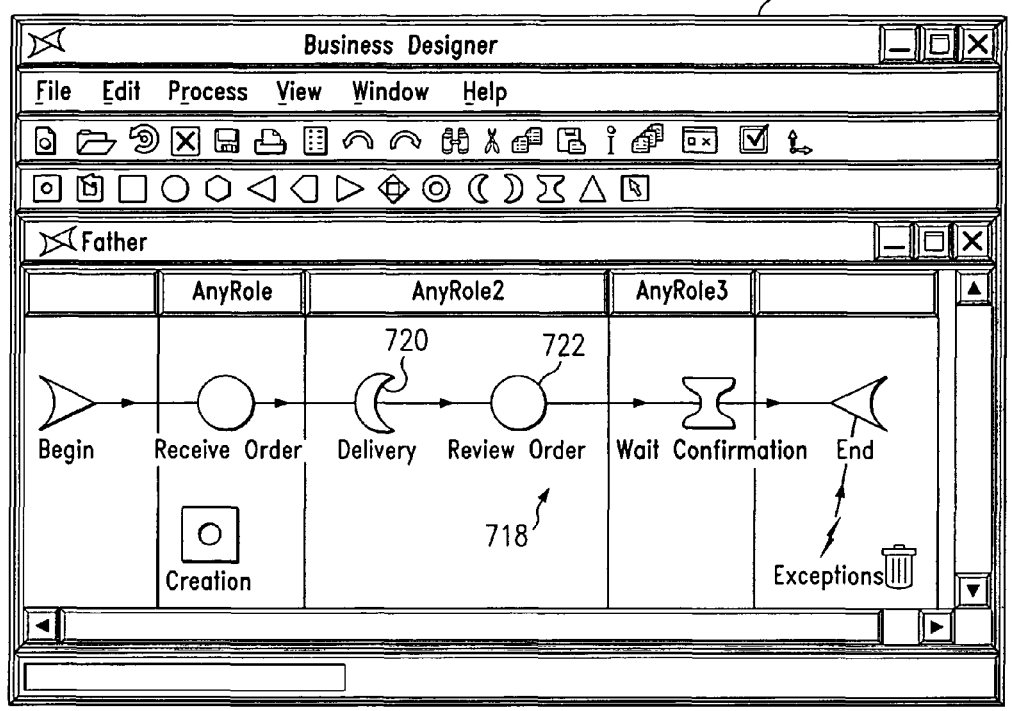

FIG. 16 illustrates an example of process-to-process notification and external notification. Process-to-process notification and external notification allow for communication and synchronization between business processes.

Process-to-process notification is based on process notification and notification wait activities. The process notification activity is used to send a notification to an instance at a notification wait activity of a second business process. If the instance is not at the notification wait activity, the notification is stored at the execution engine 140. The instance is notified when it reaches the notification wait activity. If the notification wait activity has not received the notification, the instance waits until the notification arrives and is notified by the execution engine 140, after which the instance may continue to flow through the business process.

Three types of relations between business processes: child-parent, parent-child, process-external event. A child-parent relation exists when a parent business process creates an instance in a child business process, and the child business process sends a notification to the parent business process, which is managed by business designer 700. A parent-child relation exists when a parent business process creates an instance in a child business process and the parent business process sends a notification to the child business process, which is managed by business designer 700.

A process-external event relation exists when an external source sends an external notification to an instance in a notification wait activity of a business process. The external source may comprising a program written in a different programming language or a process not related to the business process by a parent-child relationship. The external notification uniquely identifies the instance to which it is sending the notification. Parameters are used when creating instances in a process and are passed when a notification is sent to an instance in another business process.

In the illustrated example business process 718, an order at Delivery 720 to be delivered is sent asynchronously, after which processing at Review Order 722 may occur. Business process 718 waits until delivery confirmation is received.

Figure 17:
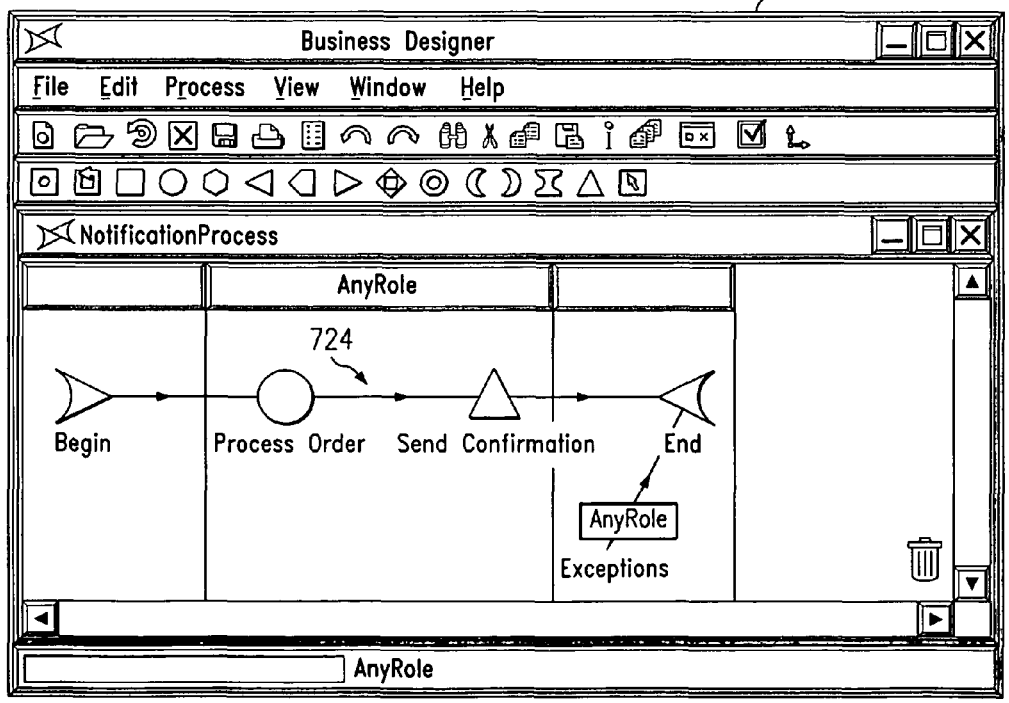

FIG. 17 illustrates an example of process-to-process notification and external notification. In the illustrated example, a first business process 724 notifies a second business process. First business process 724 sends a notification to the second business process waiting for the delivery confirmation.

Process Interruption

Figure 18:
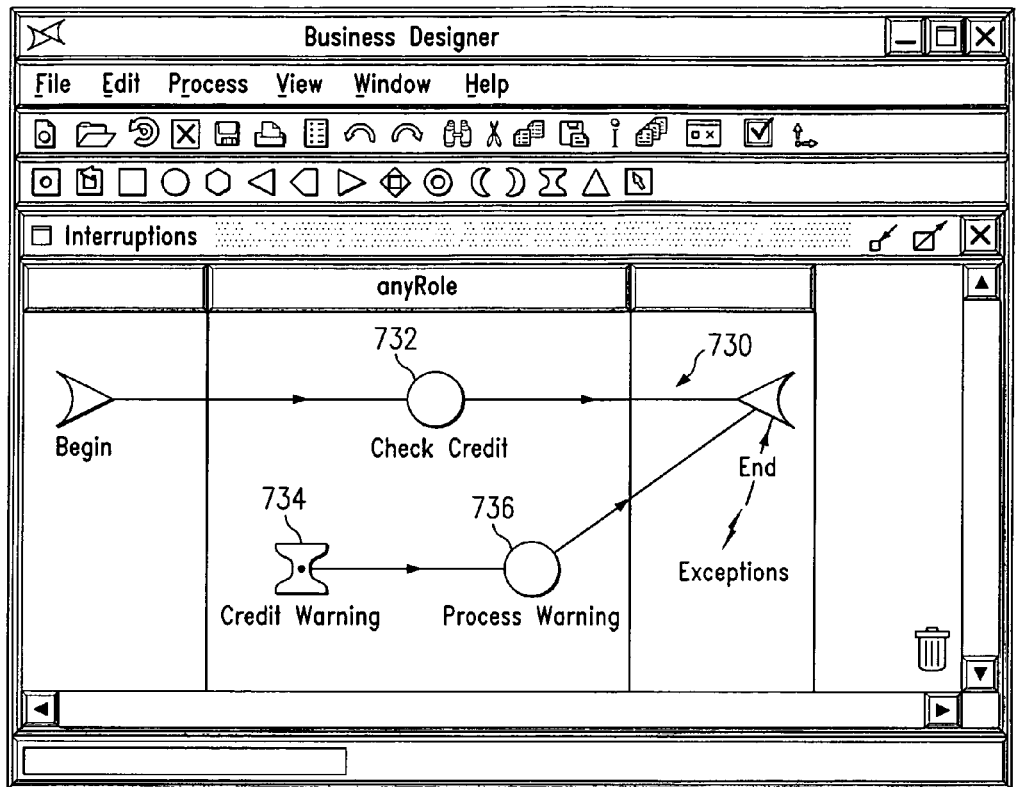

FIG. 18 illustrates an example of process interruption. Process interruption is form of process-to-process communication. Process interruption allows a first business process to interrupt a second business process in order to process an interruption or urgent event over a particular instance. This notification is similar to the notification wait activity, but in this case the instance is not required to be at the notification wait activity. Once the notification is sent, the instance is taken automatically to the notification wait activity, regardless of where the instance is in the process.

In the illustrated example, an instance in business process 730 flows to a Credit Check activity 730. Under normal conditions, the instance is processed without error, however, a warning may be issued to indicate an abnormality with a particular instance. Business process 730 receives an external notification, and the instance is automatically forwarded to a Credit Warning activity 734 and continues to flow through a Process Warning activity 736.

Polymorphic Sub-Processes

Figure 19:
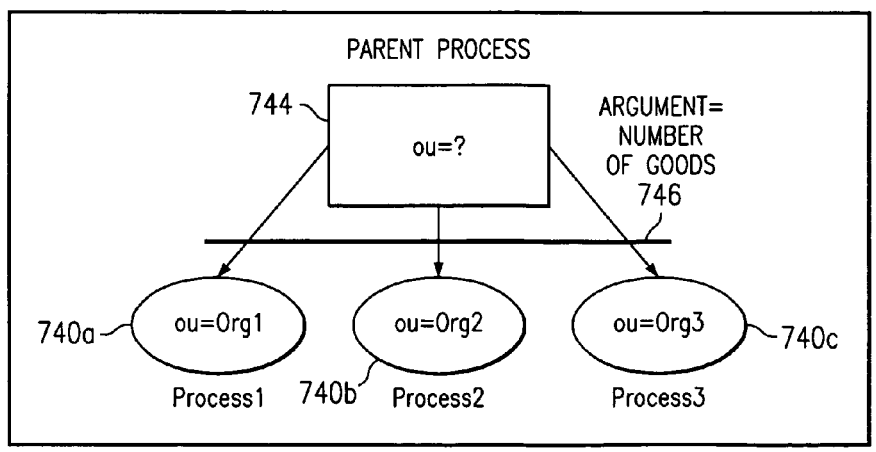
FIG. 19 illustrates polymorphic sub-processes.

FIG. 19 illustrates an example of polymorphic sub-processes. A polymorphic sub-process creates instances in different child business processes sharing the same interface, depending on variables embedded in a parent business process. According to one embodiment, a parent and child business process use the same interface to communicate between the business processes. An interface may be defined by the input and output arguments of a business process and a notification wait activity. The instance may be routed to the correct child business process according to predefined variables. The variables may include, for example, organizational unit, organization, and country.

In the illustrated example, child business Process 1 740a, Process 2 740b, and Process 3 740c of parent business process 744 share a common interface 746. Common interface 746 allows a parent business process 744 to create an instance in any of the child business processes 740.

Certain embodiments of the invention may provide numerous technical advantages. A technical advantage of one embodiment is that business processes may include activities with compensation tasks. Compensation tasks are executed when a task of an activity fails to execute, thus allowing for the performance of the activity to continue uninterrupted to completion. Compensation tasks may be used for automated business processes to maintain business process consistency.

Another technical advantage of one embodiment is that an activity may be associated with an abstract role in order to specify users representing people responsible for performing the activity. The association may provide for abstract business process modeling, which may allow for the creation of business process templates creation that may be used for different organizations.

Another technical advantage of one embodiment is that the processes of publishing and deploying business processes are separated. By separating the publication and deployment processes, a business process may be published and tested, without deploying the business process to users. Another technical advantage of one embodiment is that persistent variables are used. Persistent variables allow a value related to an instance of a business process to be efficiently carried from one activity of the business process to another activity of the same business process or of another business process.

Although an embodiment of the invention and its advantages are described in detail, a person skilled in the art could make various alterations, additions, and omissions without departing from the spirit and scope of the present invention as defined by the appended claims.

What is claimed is:

1. A computer implemented method for executing a process, said method comprising:
constructing a business process definition stored in a repository, wherein said business process definition includes one or more activities represented by graphical icons, said one or more activities being coupled by transitions, and wherein each activity includes one or more tasks that one executed complete that activity;
generating a graphical interface used to create a customized compensation task and constructing the compensation task based on instructions received on said graphical interface, wherein the graphical interface includes an activity properties interface that can be used to associate, for each activity, the customized compensation task with at least one of the activities tasks, and wherein the customized compensation task executes when the tasks fail, and wherein the compensation task includes a repetition factor rendered on the graphical interface, which when selected, causes the customized compensation task to be repeated a specified number of times, and
wherein a plurality of customized compensation tasks and an associated task is stored in a task table in the repository;
storing the business process definition into the repository;
wherein, upon executing the business process by a process execution engine, the process execution engine
initiates an instance of the business process definition stored in the repository,
executes the one or more activities of the instance of the business process definition,
determines that execution of a particular task has failed,
determines whether the particular task that failed was associated with one of the plurality of customized compensation task as defined in the task table,
determines whether the repetition factor has been selected, and
executes the customized compensation task associated with the particular task that failed to compensate for the failed task, wherein when it is determined that the repetition factor been selected, the customized compensation task is executed the specified number of times, and wherein the execution of the customized compensation task achieves steady and consistent state of the instance of the process before the at least one of the series of tasks that has failed in execution is retried by the process execution engine; and
wherein the execution of the customized compensation task causes the execution of the business process instance to continue to the next task uninterrupted by the failure of the particular task.

2. The method of claim 1, wherein the instance has a plurality of instance variables, and further comprising:
receiving a plurality of values, each value corresponding to an instance variable;
recording each instance variable and corresponding value in objects;
serializing the objects; and
storing the serialized objects in the data repository.

3. The method of claim 2, wherein each of the objects comprises a Java object.

4. The method of claim 1, further comprising:
receiving a value from a second process instance associated with an argument variable of the process instance; and
mapping an instance variable of the second process instance to the argument variable of the process instance.

5. The method of claim 1 wherein said component comprises a modular software routine that has been compiled and that can be used with other components or programs.

6. The method of claim 1 wherein an instance variable of the process instance maintains the activity where the instance is at a given moment in time during a lifecycle of the instance of said process.

7. The method of claim 1 wherein the activity of said instance connects said process to a second process instance.

8. The method of claim 1, further comprising:
instantiating a polymorphic sub-process that generates instances in two or more different child processes sharing a same interface depending on variables embedded in a parent process, such that the instance of said process is routed to the correct child process according to said variables.

9. The method of claim 1, further comprising:
interrupting said instance of the process by a different instance by transmitting a notification from said different instance, wherein said instance of the process is automatically taken to a notification wait activity upon receiving said notification, regardless where the instance is in the process.

10. The method of claim 1, wherein the compensation task further includes a repeatable box rendered on the graphical interface, wherein the repeatable box, when selected, causes the task associated with the compensation task to be repeated a specified number of times, wherein the compensation task attains steady and consistent state before the execution of the task is repeated.

11. The method of claim 1, wherein if the failed task includes transmitting an electronic mail message to at least two recipients and if the task fails in transmitting said electronic mail message to at least one of said two recipients, then the compensation task includes a disregarding electronic mail message to the other of said two recipients.

12. A non-transitory computer readable storage medium storing a set of instructions executed by one or more processors to perform a sequence of steps comprising:
constructing a business process definition stored in a repository, wherein said business process definition includes one or more activities represented by graphical icons, said one or more activities being coupled by transitions, and wherein each activity includes one or more tasks that one executed complete that activity;
generating a graphical interface used to create a customized compensation task and constructing the compensation task based on instructions received on said graphical interface, wherein the graphical interface includes an activity properties interface that can be used to associate, for each activity, the customized compensation task with at least one of the activities tasks, and wherein the customized compensation task executes when the tasks fail, and wherein the compensation task includes a repetition factor rendered on the graphical interface, which when selected causes the customized compensation task to be repeated a specified number of times, and
wherein a plurality of customized compensation tasks and an associated task is stored in a task table in the repository;
storing the business process definition into the repository;
wherein upon executing the business process by a process execution engine, the process execution engine
initiates an instance of the business process definition stored in the repository,
executes the one or more activities of the instance of the business process definition,
determines that execution of a particular task has failed,
determines whether the particular task that failed was associated with one of the plurality of customized compensation task as defined in the task table,
determines whether the repetition factor has been selected, and
executes the customized compensation task associated with the particular task that failed to compensate for the failed task wherein when it is determined that the repetition factor been selected the customized compensation task is executed the specified number of times, and wherein the execution of the customized compensation task achieves steady and consistent state of the instance of the process before the at least one of the series of tasks that has failed in execution is retried by the process execution engine; and
wherein the execution of the customized compensation task causes the execution of the business process instance to continue to the next task uninterrupted by the failure of the particular task.

13. The non-transitory computer readable storage medium of claim 12, wherein:
the instance has a plurality of instance variables;
when executed by the computer, the software is operable to:
receive a plurality of values, each value corresponding to an instance variable;
record each instance variable and corresponding value in objects;
serialize the objects; and
store the serialized objects in the data repository.

14. The non-transitory computer readable storage medium of claim 13, wherein each of the objects comprises a Java object 15. The non-transitory computer readable storage medium of claim 12, operable to:
receive a value from a second process instance associated with an argument variable of the process instance; and
map an instance variable of the second process instance to the argument variable of the process instance.

16. The non-transitory computer readable storage medium of claim 12, wherein the compensation task further includes a repeatable box rendered on the graphical interface, wherein the repeatable box, when selected, causes the task associated with the compensation task to be repeated a specified number of times, wherein the compensation task attains steady and consistent state before the execution of the task is repeated.

17. A system for executing a business process that compensates for failure of tasks therein, comprising:
one or more processors; and
a process execution engine that initiates an instance of a business process, wherein the process execution engine uses the one or more processors to
define a business process using a graphical user interface (GUI), wherein the business process includes one or more activities coupled by transitions, and wherein each activity includes one or more tasks that when executed complete that activity;
associate, for each activity, a customized compensation task with at least one of the activities tasks, wherein the customized compensation task executes when the tasks fail, and wherein the customized compensation task includes a repetition factor, which when selected, causes the customized compensation task to be repeated a specified number of times;
record a plurality of customized compensation tasks and an associated task in a task table;
wherein, upon executing the business process by the process execution engine, the process execution engine
initiates the instance of the business process,
executes the one or more activities of the instance of the business process,
determines that execution of a particular task has failed,
determines whether the particular task that failed was associated with one of the plurality of customized compensation tasks as defined in the task table,
determines whether the repetition factor has been selected, and
executes the customized compensation task associated with the particular task that failed to compensate for the failed task, wherein when it is determined that the repetition factor has been selected, the customized compensation task is executed the specified number of times; and
wherein the execution of the customized compensation task causes the execution of the business process instance to continue to the next task uninterrupted by the failure of the particular task.

18. The system of claim 17, wherein the activity properties interface includes an activity tasks section and a set of available tasks section used to define the one or more tasks and the plurality of customized compensation tasks.

19. The system of claim 18, wherein the activity tasks section includes windows and boxes used to define the one or more tasks and the plurality of customized compensation tasks, and wherein the set of available tasks section is used to select available tasks and customized compensation tasks for a particular activity.

20. The system of claim 18, wherein a customized compensation task is defined by
inserting a name of a particular customized compensation task in a customized compensation task name window, and
indicating whether the particular customized compensation task is repeated a specified number of times by selecting a repetition factor.

* * * * *

UNITED STATES PATENT AND TRADEMARK OFFICE
CERTIFICATE OF CORRECTION

PATENT NO. : 8,478,602 B2
APPLICATION NO. : 10/114491
DATED : July 2, 2013
INVENTOR(S) : Racca et al.

It is certified that error appears in the above-identified patent and that said Letters Patent is hereby corrected as shown below:

In the Claims

In column 19, line 33, In Claim 12, delete "selected" and insert -- selected, --, therefor.

In column 19, line 39, In Claim 12, delete "wherein" and insert -- wherein, --, therefor.

In column 19, line 53, In Claim 12, delete "task" and insert -- task, --, therefor.

In column 19, line 54, In Claim 12, delete "selected" and insert -- selected, --, therefor.

In column 20, line 11, In Claim 14, delete "object" and insert -- object. --, therefor.

Signed and Sealed this
Twenty-second Day of October, 2013

Teresa Stanek Rea
*Deputy Director of the United States Patent and Trademark Office*